United States Patent
Emmanuel et al.

(10) Patent No.: US 9,521,624 B2
(45) Date of Patent: *Dec. 13, 2016

(54) METHOD AND APPARATUS FOR ECONOMIZING POWER CONSUMPTION IN WIRELESS PRODUCTS

(71) Applicant: NETGEAR, INC., San Jose, CA (US)

(72) Inventors: Joseph Amalan Arul Emmanuel, Cupertino, CA (US); Shun-Liang Yu, Milpitas, CA (US); Peiman Amini, Mountain View, CA (US)

(73) Assignee: NETGEAR, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/980,761

(22) Filed: Dec. 28, 2015

(65) Prior Publication Data

US 2016/0135126 A1    May 12, 2016

Related U.S. Application Data

(63) Continuation of application No. 14/253,546, filed on Apr. 15, 2014, now Pat. No. 9,226,242.

(60) Provisional application No. 61/928,960, filed on Jan. 17, 2014.

(51) Int. Cl.
*H04W 52/02*    (2009.01)

(52) U.S. Cl.
CPC ..... *H04W 52/0258* (2013.01); *H04W 52/0254* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 6,470,447 B1* | 10/2002 | Lambert | H04W 12/02 380/258 |
| 8,560,645 B2* | 10/2013 | Linden | H04L 41/0806 370/310.2 |
| 9,226,242 B2* | 12/2015 | Emmanuel | H04W 52/0258 |
| 2012/0213139 A1* | 8/2012 | Zee | H04W 52/26 370/311 |
| 2013/0005353 A1* | 1/2013 | Traynor | H04W 52/0254 455/456.1 |
| 2013/0053044 A1* | 2/2013 | Davies | H04W 8/18 455/438 |
| 2013/0121194 A1* | 5/2013 | Heshmati | H04W 52/0258 370/252 |
| 2013/0170419 A1* | 7/2013 | Bakthavathsalu | H04W 52/0254 370/311 |

(Continued)

*Primary Examiner* — Brian Roberts
(74) *Attorney, Agent, or Firm* — Michael A. Glenn; Perkins Coie LLP

(57) ABSTRACT

Various of the disclosed embodiments concern efficiency improvements in wireless products. For example, some embodiments specify profiles for regional and custom-specified operational constraints. The profiles may be retrieved from across a network or stored locally upon the device. The profiles may specify various configuration adjustments that optimize the system's performance. For example, when possible, some embodiments may allow the system to operate at a lower power level and to thereby save energy. Various factors and conditions may be assessed in some embodiments prior to adjusting the existing power configuration.

20 Claims, 16 Drawing Sheets

(56) References Cited

U.S. PATENT DOCUMENTS

| | | | |
|---|---|---|---|
| 2014/0179343 A1* | 6/2014 | Alpert | H04W 4/023 455/456.1 |
| 2015/0111562 A1* | 4/2015 | Traynor | H04W 52/0254 455/418 |

* cited by examiner

100

WW WLAN Tx Power / PSD info

| Country | Regulatory | Frequency (GHz) | Tx Power | Standard |
|---|---|---|---|---|
| USA | FCC | 2.4~2.4835 | 1W(30dBm) | FCC 47 C.F.R. Part 15 Subpart E (5G, UNII) |
| | | 5.15~5.25 | 50mW(17dBm) or 4dBm + 10 log B lesser value | FCC 47 C.F.R. Part 15 Subpart C (2.4G, DTS) |
| | | 5.25~5.35 | 250mW(24dBm) or 11dBm + 10 log B lesser value | FCC 47 C.F.R. Part 15 Subpart B (EMI) |
| | | 5.470~5.725 | 250mW(24dBm) or 11dBm + 10 log B lesser value | FCC 47 OET Bulletin 65, Supplement C (SAR) |
| | | 5.725~5.850 | 1W(30dBm) | |
| EU | CE | 2.4~2.4835 | 100mW(20dBm)(AV eirp) | EN 300 328 (2.4G) |
| | | 5.15~5.35 | 200mW(23dBm)(AV eirp) | EN 301 893 (5G) |
| | | 5.470~5.725 | 1W(30dBm)(AV eirp) | EN 301 489-1/-17 (EMC) |
| | | | | EN 60950 (LVD) |
| Canada | IC | 2.4~2.4835 | 200mW(eirp) or 10dBm + 10 log B lesser value | RSS-210 (RF, EMI, SAR) |
| | | 5.15~5.25 | 250mW(24dBm) or 11dBm + 10 log B lesser value | |
| | | 5.25~5.35 | 250mW(24dBm) or 11dBm + 10 log B lesser value | |
| | | 5.470~5.725 | 250mW(24dBm) or 11dBm + 10 log B lesser value | |
| | | 5.725~5.850 | 1W(30dBm) | |
| Taiwan | NCC | 2.4~2.4835 | 1W(30dBm) | LP0002 (RF) |
| | | 5.25~5.35 | 50mW(17dBm) or 4dBm + 10 log B lesser value | |
| | | 5.470~5.725 | 250mW(24dBm) or 11dBm + 10 log B lesser value | |
| | | 5.725~5.850 | 1W(30dBm) | |
| China | SRRC | 2.4~2.4835 | 100mW (=20dBm) eirp (gain <10dBi) 500mW (=27dBm) eirp (gain ≥10dBi) | |
| | | 5.15~5.25 | Transition period | |
| | | 5.25~5.35 | | |
| | | 5.725~5.850 | 2W (=33dBm) EIRP | |

*FIG. 1*

| Country | Regulatory | Frequency (GHz) | Tx Power | Standard |
|---|---|---|---|---|
| Korea | KCC | 2.4~2.4835 | 10mW/MHz for 20MHz<br>5mW/MHz for 40MHz | RRL (RF) |
| | | 5.15~5.25 | 2.5mW/MHz for 20MHz<br>1.25mW/MHz for 40MHz<br>0.625mW/MHz for 80MHz | |
| | | 5.25~5.35 | 10mW/MHz for 20MHz<br>5mW/MHz for 40MHz<br>2.5mW/MHz for 80MHz | |
| | | 5.470~5.735 | 10mW/MHz for 20MHz<br>5mW/MHz for 40MHz<br>2.5mW/MHz for 80MHz | |
| | | 5.725~5.825 | 10mW/MHz for 20MHz<br>5mW/MHz for 40MHz | |
| Japan | Radio Law | 2.4~2.4835 | 10mW/MHz for 20MHz<br>5mW/MHz for 40MHz | ARIB STD-T71 (5G) |
| | | 2.471~2.497 | 10mW/MHz | ARIB STD-T66 (2.4G, 2.4-2.4835) |
| | | 5.150~5.250 | 10mW/MHz for 20MHz<br>5mW/MHz for 40MHz | ARIB STD-T33 (2.4G, 2497) |
| | | 5.250~5.350 | 10mW/MHz for 20MHz<br>5mW/MHz for 40MHz | |
| | | 5.470~5.725 | 10mW/MHz for 20MHz<br>5mW/MHz for 40MHz | |
| Australia/ New Zealand | C-TICK | 2.4~2.4835 | 36dBm (PK eirp) | AS/NZS 4771 (RF) |
| | | 5.15~5.35 | 20mW(=23dBm) (AV eirp) | AS/NZS CISPR 22 (EMC) |
| | | 5.470~5.725 | 1mW(=30dBm) (AV eirp) | |
| | | 5.725~5.850 | 36dBm (PK eirp) | |
| Malaysia | SIRIM | 2.4~2.4835 | Follow CE or FCC | CETS-R/CKL/002 |
| | | 5.25~5.35 | | |
| | | 5.470~5.725 | | |
| | | 5.725~5.850 | | |

*FIG. 2*

| 2.4GHz - FCC | | | | | | | | | | |
|---|---|---|---|---|---|---|---|---|---|---|
| Model | SKY85309 | | | SKY85309 (Output reduce 3dBm power at bandage channel) | | | | | | |
| DC Voltage | 5 | | | 5 | | | | 3.3 | | |
| Mode | HT20_MCS0 | | | HT20_MCS0 | | | | HT20_MCS0 | | |
| Channel | Current (A) | Output Power (dBm) | Power (W) | Current (A) | Output Power (dBm) | Power (W) | | Current (A) | Output Power (dBm) | Power (W) | Difference |
| Ch 1 / 2412MHz | 0.73 | 30.2 | 3.65 | 0.533 | 27.05 | 2.665 | | 0.512 | 26.96 | 1.6896 | 0.9754 |
| Ch 2 / 2417MHz | 0.732 | 30.17 | 3.66 | | | 2.665 | | | | 0 | 0 |
| Ch 3 / 2422MHz | 0.736 | 30.2 | 3.68 | | | 2.665 | | | | 0 | 0 |
| Ch 4 / 2427MHz | 0.737 | 30.29 | 3.685 | | | 2.665 | | | | 0 | 0 |
| Ch 5 / 2432MHz | 0.743 | 30.42 | 3.715 | | | 2.665 | | | | 0 | 0 |
| Ch 6 / 2437MHz | 0.75 | 30.51 | 3.75 | | | 2.665 | | | | 0 | 0 |
| Ch 7 / 2442MHz | 0.756 | 30.63 | 3.78 | | | 2.665 | | | | 0 | 0 |
| Ch 8 / 2447MHz | 0.762 | 30.63 | 3.81 | | | 2.665 | | | | 0 | 0 |
| Ch 9 / 2452MHz | 0.765 | 30.63 | 3.825 | | | 2.665 | | | | 0 | 0 |
| Ch 10 / 2457MHz | 0.766 | 30.63 | 3.83 | | | 2.665 | | | | 0 | 0 |
| Ch 11 / 2462MHz | 0.764 | 30.59 | 3.82 | 0.567 | 27.66 | 2.865 | | 0.547 | 27.67 | 1.8051 | 1.0299 |

5GHz - FCC

| Model | SKY85710 (3x3 solution at FCC band 1) | | | | | |
|---|---|---|---|---|---|---|
| DC Voltage | 5 | | | 3.3 | | |
| Mode | HT20_MCS0 | | | HT20_MCS0 | | |
| Channel | Current (A) | Output Power (dBm) | Power (W) | Current (A) | Output Power (dBm) | Power (W) | Difference |
| 36 | 0.21 | 12.1 | 1.05 | 0.1 | 12.01 | 0.33 | 0.72 |
| 48 | 0.205 | 11.99 | 1.025 | 0.099 | 12.58 | 0.3267 | 0.3267 |

| Model | SKY85710 (2x2 solution at FCC band 1) | | | | | |
|---|---|---|---|---|---|---|
| DC Voltage | 5 | | | 3.3 | | |
| Mode | HT20_MCS0 | | | HT20_MCS0 | | |
| Channel | Current (A) | Output Power (dBm) | Power (W) | Current (A) | Output Power (dBm) | Power (W) | Difference |
| 36 | 0.212 | 14.25 | 1.06 | 0.11 | 14.38 | 0.363 | 0.697 |
| 48 | 0.21 | 14.02 | 1.05 | 0.106 | 14.36 | 0.3498 | 0.7002 |

METHOD AND APPARATUS FOR ECONOMIZING POWER CONSUMPTION IN WIRELESS PRODUCTS

CROSS-REFERENCE TO RELATED APPLICATIONS

This application is a continuation of U.S. patent application Ser. No. 14/253,546, entitled "METHOD AND APPARATUS FOR ECONOMIZING POWER CONSUMPTION IN WIRELESS PRODUCTS" filed Apr. 15, 2014, which is entitled to the benefit of and claims priority to U.S. Provisional Patent Application No. 61/928,960, entitled "METHOD AND APPARATUS FOR ECONOMIZING POWER CONSUMPTION IN WIRELESS PRODUCTS" filed Jan. 17, 2014, the contents of each which are incorporated herein by reference in their entirety for all purposes.

FIELD

Various of the disclosed embodiments concern power and/or operational efficiency in wireless devices.

BACKGROUND

As the demand for wireless connectivity increases additional regulations and constraints are being imposed upon wireless devices across a wider geographic and market spectrum. Many of these wireless devices provide only one or a few possible configurations. Accordingly, these devices cannot operate efficiently in all the existing operation environments, let alone adapt when the regulations are changed or user preferences modified. Thus, there exists a need for efficient, easily configured, and possibly automated systems to adjust wireless device configurations to particular environments and regulations.

BRIEF DESCRIPTION OF THE DRAWINGS

One or more embodiments of the present disclosure are illustrated by way of example and not limitation in the figures of the accompanying drawings, in which like references indicate similar elements.

FIG. 1 is a table depicting transmission power regulation information for various jurisdictions as may apply in certain of the disclosed embodiments.

FIG. 2 is a table depicting transmission power regulation information for various jurisdictions as may apply in certain of the disclosed embodiments.

FIG. 10 is a table depicting various current and power levels for various channels as may be associated with some embodiments.

FIG. 11 is a table depicting various current and power levels for various channels as may be associated in some embodiments.

Figure 3:
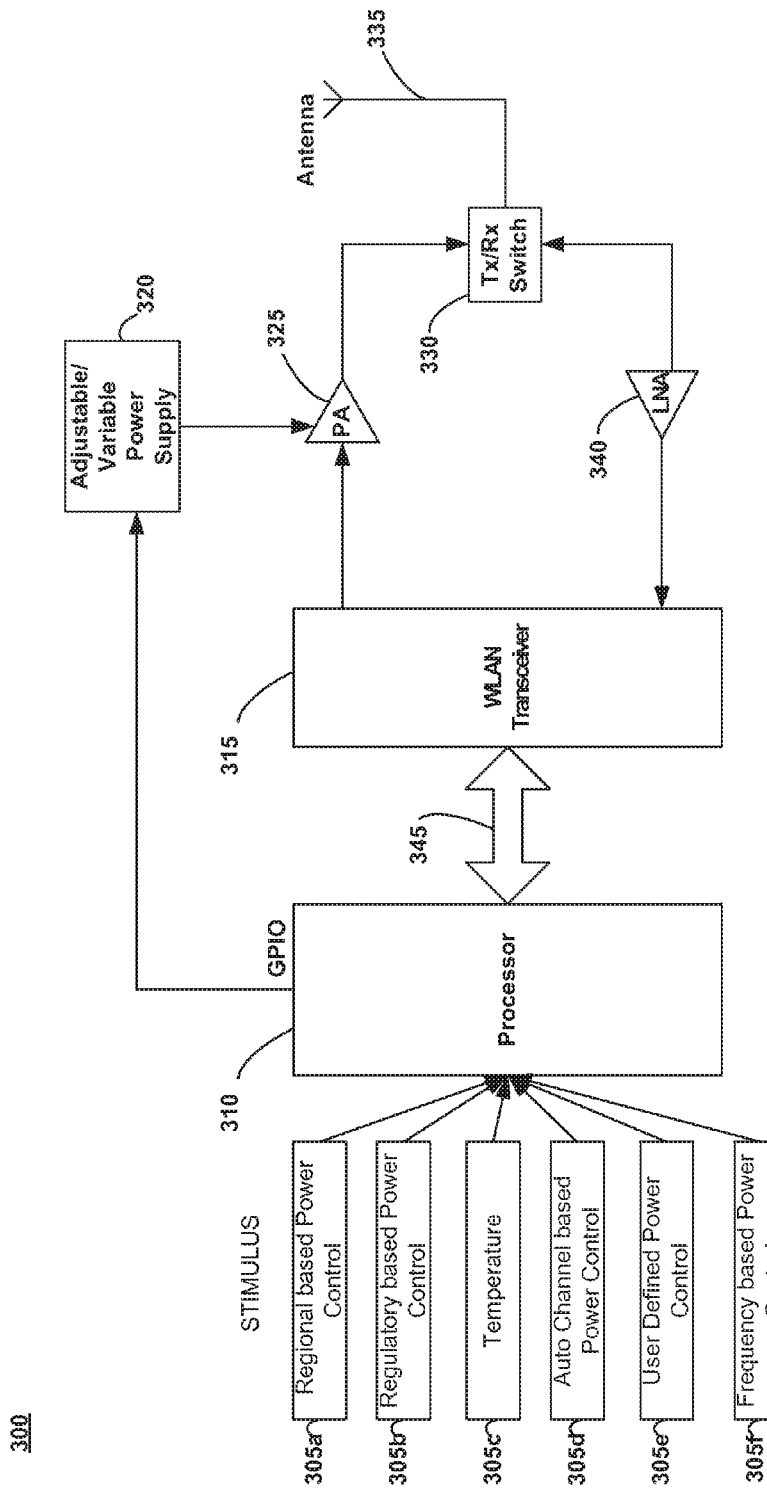
FIG. 3 is a system-level block diagram of an example system configured for one or more stimuli as may be implemented in some embodiments.

Those skilled in the art will appreciate that the logic and process steps illustrated in the various flow diagrams discussed below may be altered in a variety of ways. For example, the order of the logic may be rearranged, substeps may be performed in parallel, illustrated logic may be omitted, other logic may be included, etc. One will recognize that certain steps may be consolidated into a single step and that actions represented by a single step may be alternatively represented as a collection of substeps. The figures are designed to make the disclosed concepts more comprehensible to a human reader. Those skilled in the art will appreciate that actual data structures used to store this information may differ from the figures and/or tables shown, in that they, for example, may be organized in a different manner; may contain more or less information than shown; may be compressed, scrambled and/or encrypted; etc. One will recognize that various of the operations performed at a device may be performed at any point in its operation (e.g., at boot, following initialization, during steady-state operations, etc.).

DETAILED DESCRIPTION

Various embodiments of the present disclosure include systems and methods for improving efficiency of wireless systems. For example, a wireless WLAN device may adjust the bias point of one or more amplifiers based upon channel preferences and relevant regional regulatory requirements. Regulations in the United States may differ greatly than regulations in e.g., Saudi Arabia. Accordingly, in some embodiments, the wireless system may retrieve and/or consult profiles specifying suitable operating conditions for its current geographic and/or operational circumstances.

Various example embodiments will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

System Topology Overview for Delivering/Running Applications

Various of the disclosed embodiments concern systems and methods to improve power consumption in, e.g., a WLAN device based upon the operating channel and/or the regional settings of the device. The WLAN protocol may require a linear RF power amplifier to amplify complex modulation signals (such as 64/256 QAM). In order to have linear operation the power amplifier may need to operate in, e.g., the Class-A/AB mode. Operating in this mode may consume considerable DC Power (e.g., due to the bias point being at the middle of the AC load line).

Due to various regulatory requirements (e.g., the FCC, CE, etc.) some systems may not be allowed to transmit the same transmit powers on all channels. For example, in North America (FCC), the transmit power of Channels 1 and 11 in the 2.4 GHz band may be limited by FCC regulations to 3-9 dB. In contrast, the middle channels 2-10 may be allowed to operate in a different range, e.g., a higher range. Various of the disclosed embodiments contemplate reducing power in Channels 1 & 11 to reduce amplifier DC power dissipation.

As another example, in response to FCC limits some embodiments can transmit low power in channels 36-64 (EIRP=23 dBm) and high power in channels 149-165 (EIRP=36 dBm) in the 5 GHz range. Absent the power amplifier biasing adjustments of the disclosed embodiments, the system may dissipate a similar amount of DC power for both channel ranges 36-64 & 149-165. In contrast, various of the disclosed embodiments may reduce DC power dissipation based upon the selected channel. As the regulations may be region-based, various embodiments may include a plurality of profiles addressing the constraints imposed by each region, as discussed in greater detail herein. These profiles may be included with the device when manufactured, or installed manually or over a network at a subsequent time.

FIG. 1 is a table 100 depicting transmission power regulation information for various jurisdictions as may apply in certain of the disclosed embodiments. For example, in the United States the Federal Communications Commission (FCC) dictates that the 2.4-2.4835 GHz frequency range have a maximum power of 1 watt, while the 5.470-5.725 GHz frequency range have a maximum power of only 250 milliwatts. While Canada and Taiwan impose similar restrictions on the 2.4-2.4835 GHz and 5.470-5.725 GHz frequency ranges, China instead requires a 100 mW or 500 mw upper bound for the 2.4-2.4835 GHz frequency range depending upon the gain level. FIG. 2 is a table 200 depicting transmission power regulation information for various jurisdictions as may apply in certain of the disclosed embodiments. As indicated, Japan and Korea also impose different restrictions for the 2.4-2.4835 GHz and 5.470-5.725 GHz frequency ranges than in the United States. Additionally, these jurisdictions base the maximum power on an incremental cap determined by the frequency of the receiving device, (e.g. 10 mW per additional 1 MHz in Korea until 20 MHz and then 5 mW per additional 1 MHz until reaching 40 MHz). At present, China does not use the 5.15 GHz-5.35 GHz bands. Accordingly, in some embodiments discussed below, the profiles will be adjusted or updated to reflect the availability of these bands once they are approved.

While these jurisdictional requirements alone impose considerable complications to efficient transmitter operation, operators within each jurisdiction may impose additional requirements. For example, operators may desire to limit transmitter functionality in certain locations of a facility during particular times of day or within the presence/absence of certain devices. Abiding by operator preferences and regional regulation requirements while simultaneously addressing transmitter efficiency can be a daunting task. Various embodiments contemplate methods and system-level organizational approaches which can facilitate efficient, effective, and relatively easy configuration by an operator or an automated system to meet these operational goals.

FIG. 3 is a system-level block diagram of an example system 300 configured for one or more stimuli as may be implemented in some embodiments. The example system 300, may be, e.g., a wireless access point, router, relay, mobile device, etc. A processor 310 may receive a plurality of stimuli 305a-f. The stimuli 305a-f and/or action to be taken based thereon may be specified in a profile as described in greater detail herein. The processor 310 may be in communication with a WLAN transceiver 315 via bus 345. The transceiver 315 may generate communications signals which are amplified by power amplifier 325 and transmitted via transmit/receive switch 330 across antenna 335. Incoming signals may be received by the antenna 335 and conveyed to low noise amplifier 340 via switch 330. Low noise amplifier 340 may amplify the signal and convey it to transceiver 315, where the signal is passed across the bus 345 to processor 310 for processing.

The stimuli provided to the processor 310 may include regional-based power control 305a, regulatory-based power control 305b, temperature measurements 305c, auto-channel based power control 305d, user-defined power control 305e, frequency-based power control 305f, etc. These stimuli may be used, in conjunction with a profile, to determine the appropriate operating conditions for the system 300, e.g., the operation of power amplifier 325, transceiver 315, etc. For example, the 802.11 power management operations (such as a sleep time or mode) and current levels of the power amplifiers in the system may be adjusted based on a comparison of one or more stimuli values with a profile's criteria (e.g., processor 310 may use acc adjustable/variable power supply 320 to adjust the current levels of power amplifier 325). As another example, if the profile specifies a first bias for a first channel and a second bias for a second channel, the system may adopt the second bias after consulting the profile following a transition stimulus from the first channel to the second channel. The profile may be used to weight various of the stimuli values and to select a course of action based thereon. For example, the system may consider the scaled values in isolation, or as a weighted average.

Figure 4:
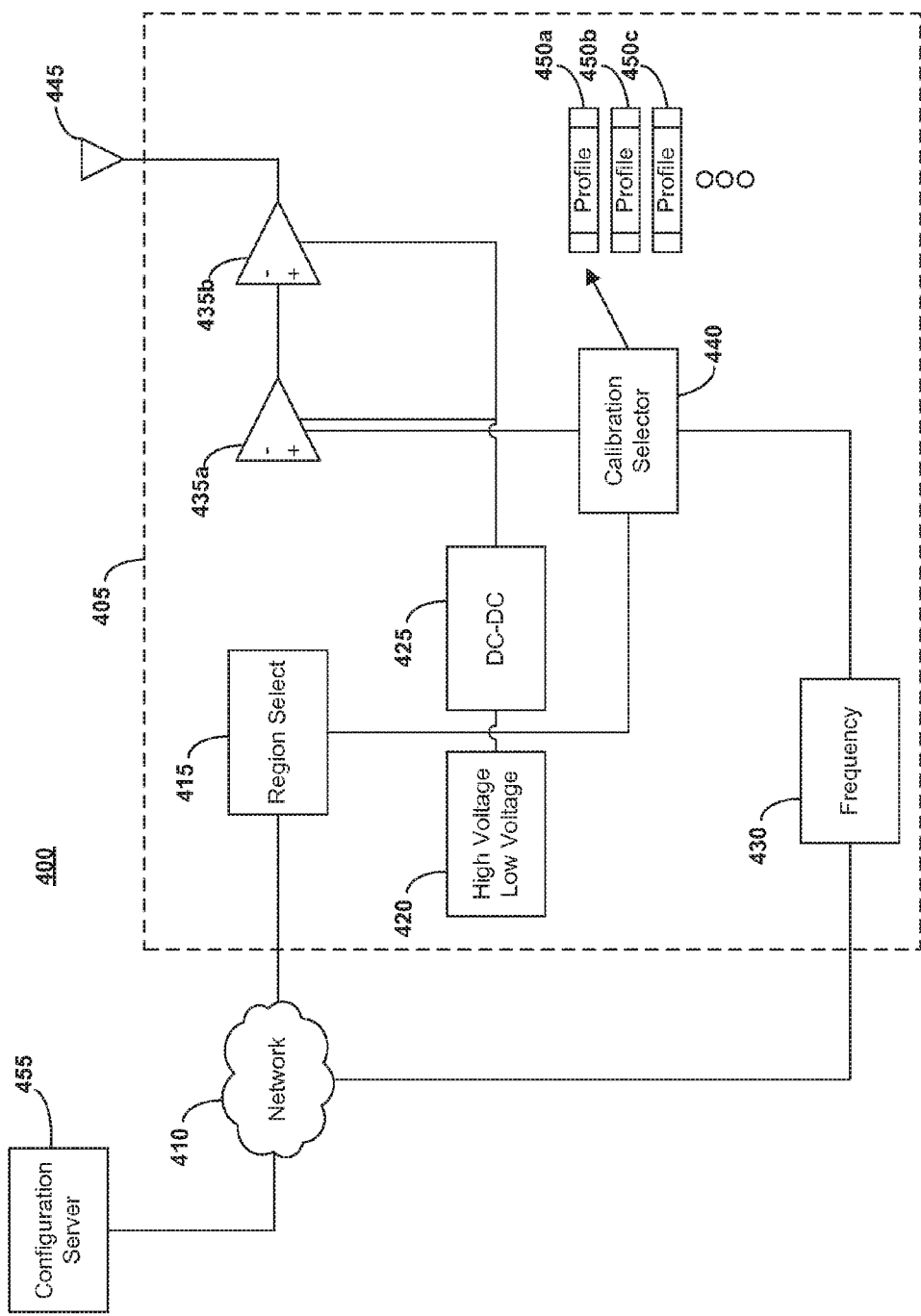
FIG. 4 is a system-level block diagram of various components as may be implemented in some embodiments.

FIG. 4 is a system-level block diagram of various components as may be implemented in some embodiments. The system 400 may be the same as system 300 in some embodiments (e.g., various modules such as the "region select" module 415 may be run as software on processor 310). Accordingly, the wireless device 405 may be a WLAN system, e.g. a router, wireless access point, USB peripheral, or the like. The device 405 may be in communication with a configuration server 455 via a network 410, e.g., a cloud-based system and/or the Internet. In some embodiments, the system 400 is a standalone system and operates without a network connection (and may instead, e.g., receive user input directly regarding profile data and regional information).

The wireless device 405 may include a region selection module 415 and a frequency adjustment module 430. In some embodiments, the region selection module 415 and the frequency adjustment module 430 may receive configuration data from the server 455. For example, the server may indicate the location of the system 400 to the region select module 415. The frequency adjustment module 430 and the region selection module 415 may convey the information to a calibration selector 440. The calibration selector 440 may select one or more profiles from a plurality of profiles 450a-c. High and low voltage configurations 415 (and in some embodiments many more than these binary states) may be provided to DC-DC current component 425. The calibration selector 440 may adjust one or more operational amplifiers 435a-b directly or via DC-DC current component 425. Adjustment of a bias point associated with one or more amplifiers 435a-b may reduce DC power dissipation while still permitting suitable operation within a desired frequency range.

The profiles 450a-c may specify the bias points for amplifiers 435a-b based on one or more desired frequency ranges of operation, user preferences, and/or regional specifications. For example, the profiles 450a-c may specify a particular device configuration based upon the desired operating channel and/or regional setting (and the corresponding regulation requirements) given one or more stimuli. Note that the profiles may specify different power levels for different channels. The profiles 450a-c may be installed in the device 405 at the time of manufacture in some embodiments, or may be downloaded from configuration server 455. In some embodiments, the device 405 may determine its geographic location based upon an Internet Protocol (IP) address dynamically assigned to the device 405 (e.g., by consulting a gateway server) or based upon configuration and/or installation information provided by a user.

Figure 5:
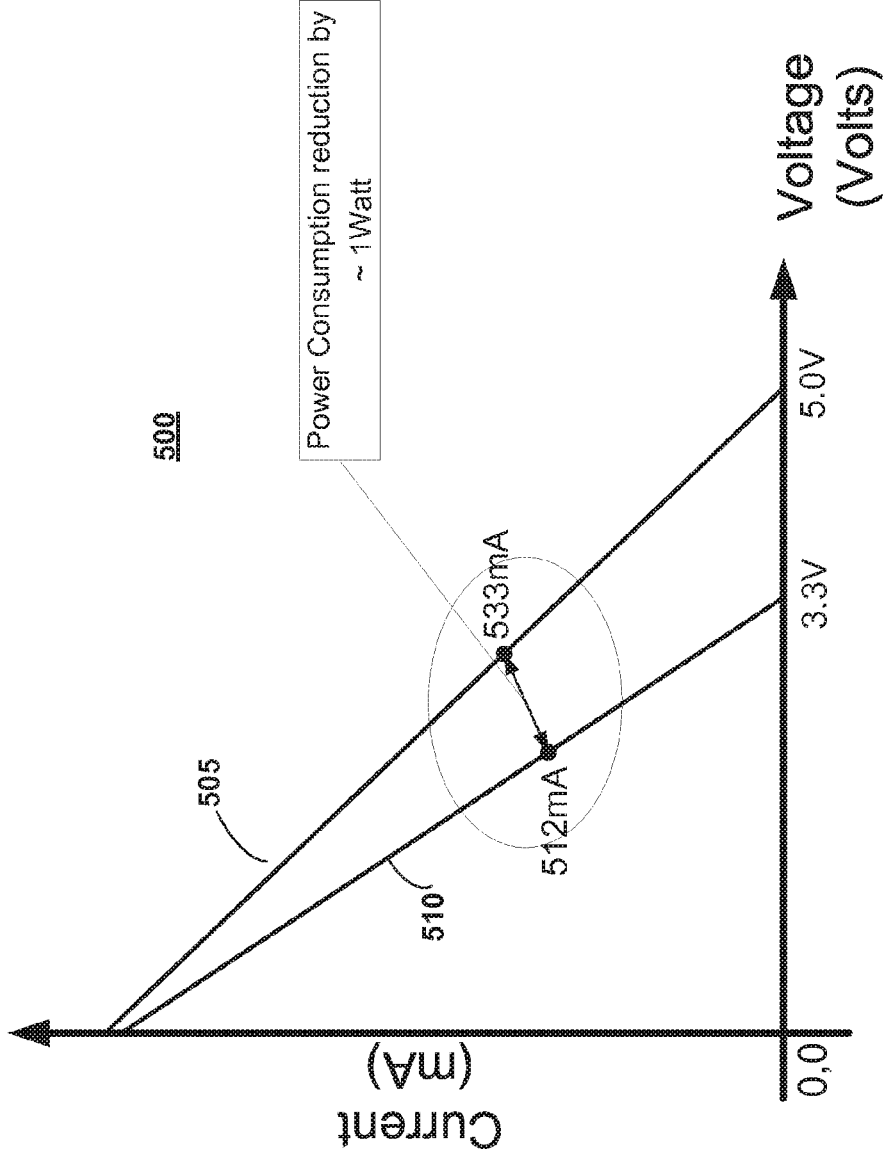
FIG. 5 is a plot of current, voltage, and power consumption relations in 802.11b/g/n modes as may be associated with some embodiments.

FIG. 5 is a plot 500 of current, voltage, and power consumption relations in 802.11b/g/n modes as may be associated with some embodiments. Particularly, current and voltage may vary as depicted by a first relation 505 and a second relation 510. As depicted, a system adopting a configuration effecting the first relation 505 may consume an additional watt (power=current×voltage) of power as compared to the second configuration 510. Thus, various embodiments provide profile configurations that facilitate operation in the second relation 510 rather than the first relation 505 whenever possible.

Figure 6:
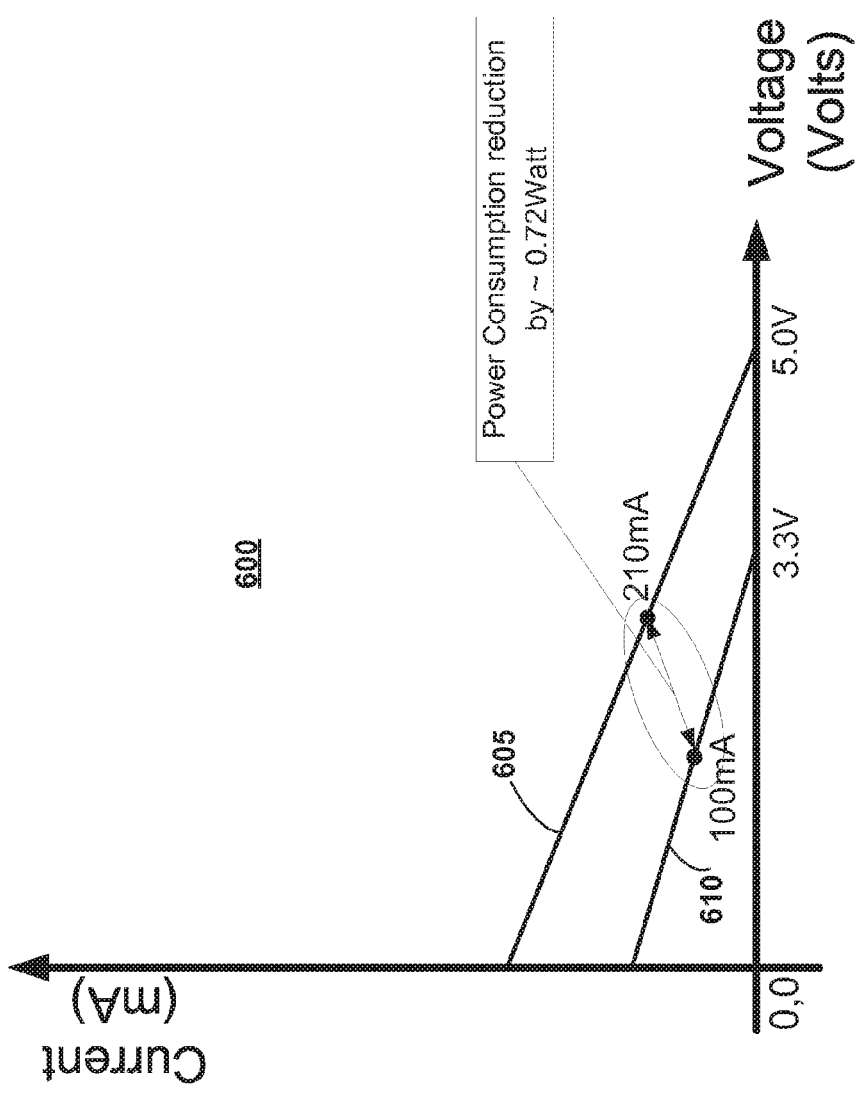
FIG. 6 is a plot of current, voltage, and power consumption relations in 802.11a/n/ac modes may be associated with some embodiments.

FIG. 6 is a plot 600 of current, voltage, and power consumption relations in 802.11a/n/ac modes may be associated with some embodiments. Particularly, current and voltage may adjust as depicted by a first relation 605 and a second relation 610. As depicted, a system adopting a configuration effecting the first relation 605 may consume an additional 0.72 watts (power=current×voltage) of power as compared to the second configuration 610. Thus, various embodiments provide profile configurations that facilitate operation in the second relation 610 rather than the first relation 605 whenever possible.

Figure 7:
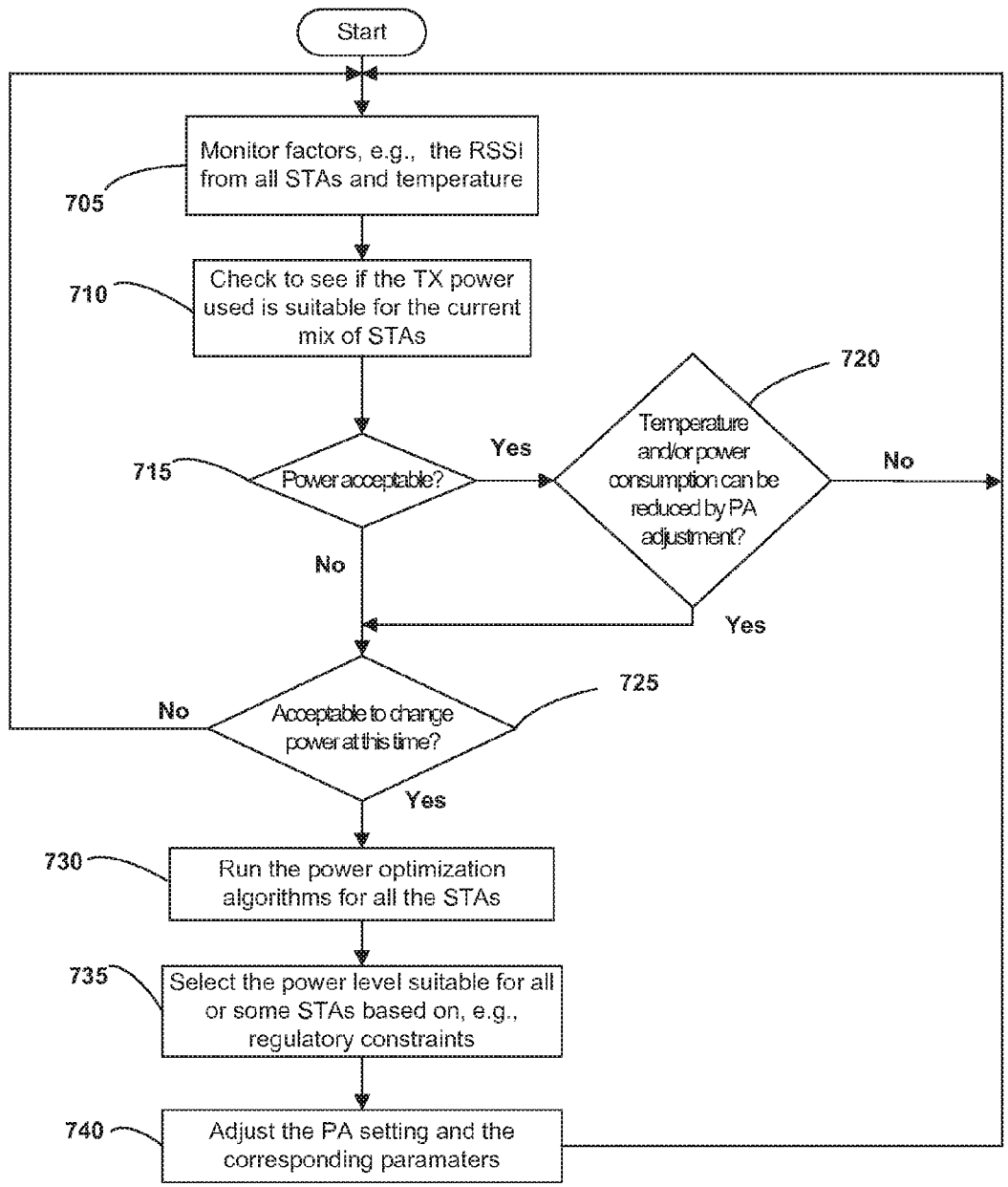
FIG. 7 is a flow diagram depicting various transmitter/receiver power consumption control operations as may be implemented in some embodiments.

FIG. 7 is a flow diagram depicting various transmitter/receiver power consumption control operations as may be implemented in some embodiments. At block 705 the system may monitor various factors, e.g. the Received Signal Strength Indication (RSSI) from all stations, system or ambient temperature, etc. (e.g., consider the factors 305a-f). The monitoring may occur periodically or aperiodically and may or may not be part of standard processes of 802.11 beacon/frame transmission and receipt. At block 710, the system may also verify that the transmission power used is appropriate for the current mix of stations. Though separated for clarity, one will recognize that this determination may be included in the factors monitored at block 705. The current mix of stations may correspond to the "stimuli" in this example.

At block 715, the system may determine whether the current power allocation is acceptable based upon the factors and/or station assessment. Acceptability may be determined based upon a plurality of criterion, e.g., power levels preferred by a user, preferred communication ranges and quality of service, the conditions of one or more service level agreements, a channel to bias correspondence, regional location, etc. Even if the power is acceptable, e.g., if it satisfies a required or preferred number of the criterion, at block 720 the system may still determine if the temperature and/or power consumption may be reduced. For example, if a satisfactory number of the criterion from block 715 may still be satisfied at a lower power level, the system may consider transitioning to block 725. Otherwise, if the power is acceptable and the adjustments of block 720 are not to be performed, the system may return to monitoring at blocks 705 and 710.

If the power level is unacceptable to meet the criterion of block 715, or if an adjustment is determined to be appropriate at block 720, the system may transition to block 725 and determine if it is acceptable to change the power level at this time. For example, even though the system's current operation may exceed or fall short of a desired criterion, the current moment may not be suitable for making an adjustment. The system may be meeting a temporary service criterion (e.g., operating at a higher power during a busy part of the workday) that takes precedence to more efficient operation. The conditions, criteria, and factors to monitor in each of blocks 705-725 may be specified in whole or in part by a profile in some embodiments.

If it is acceptable to make a power adjustment at this time at block 725, then at block 730 the system may run power optimization algorithms for the stations. At block 735, the system may select a transmission and/or reception power level suitable for all or some (e.g., a majority) of the stations. At block 740, the system may adjust the appropriate settings, e.g., the parameters of variable power supply 320 or amplifier 325. Such adjustments may be in accordance with local regulatory requirement as confirmed, e.g., by one or more profiles.

Figure 8:
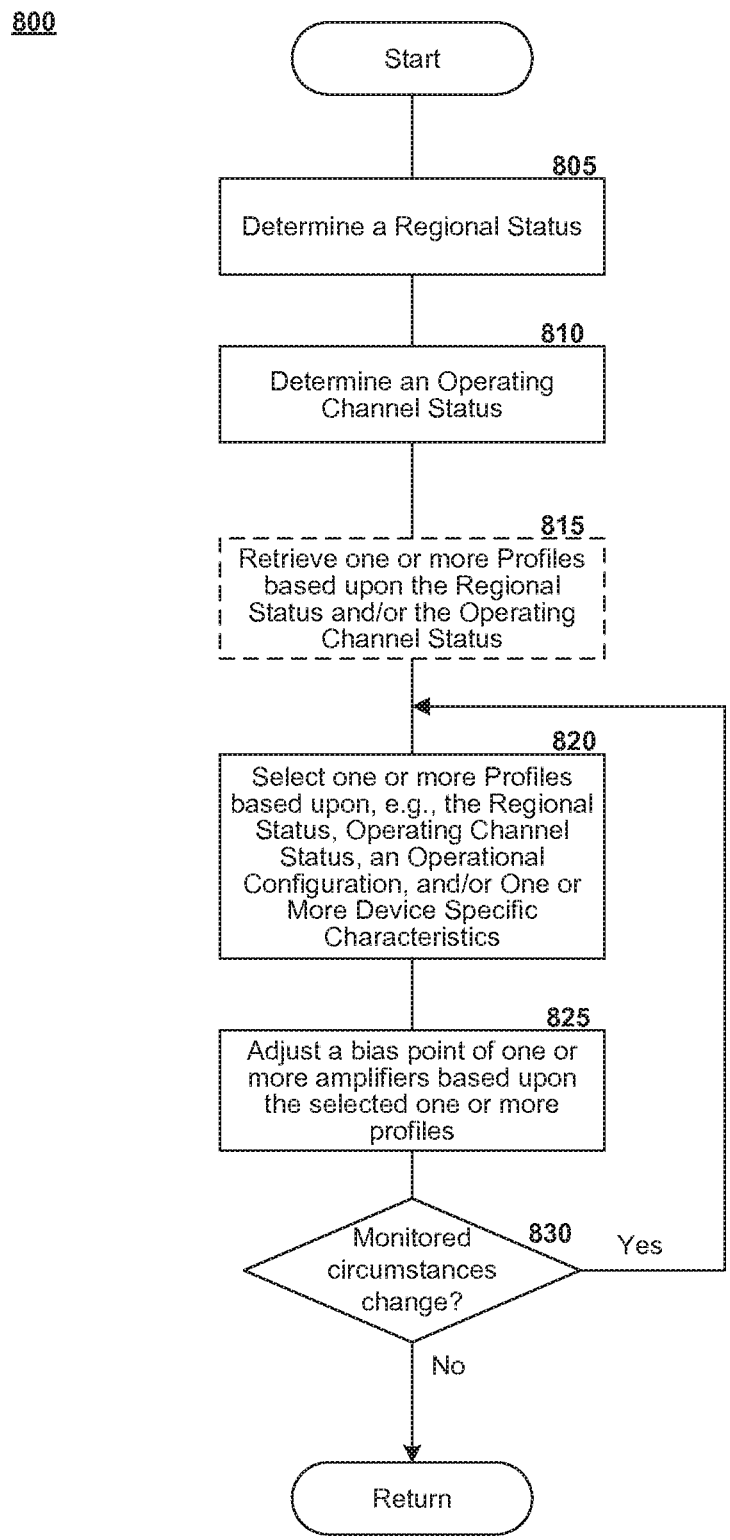
FIG. 8 is a flow diagram depicting various power consumption control operations using profiles as may be implemented in some embodiments.

FIG. 8 is a flow diagram depicting various power consumption control operations 800 using profiles as may be implemented in some embodiments. At block 805 the system, e.g., device 300 may determine its regional status. This status may be hard coded in the device, inferred from an IP address, provided by a user, etc. At block 810, the system may determine an operating channel status. For example, a user may have specified the desired channels of operation, or the system may have inferred the channels based upon local regulations (e.g., as specified in a previously retrieved profile), available frequencies, desired operation, etc.

At block 815, the device may retrieve one or more profiles based upon the regional status and/or the operating channel status. As discussed, these profiles may be, e.g., preinstalled on the device, may be downloaded by request from a server, or may be periodically updated automatically. Each profile may specify one or more operating configurations, e.g., bias points for one or more linear operational amplifiers, and may do so in correlation with one or more stimuli values or ranges. At block 820 the system may select one or more profiles based upon the regional status, operating channel status, an operational configuration of the device (e.g., user-specified desire to operate in a low-power configuration), and/or one or more device-specific characteristics. For example, the profiles may be used for a family of devices and this particular device may need to tailor the application of the profile to its particular capabilities and circumstances.

At block 825, the device may adjust various configuration settings based upon the profile. For example, the system may adjust a bias point on one or more amplifiers to reduce energy loss. In some regions, the device may only be permitted to operate in a lower frequency than its entire potential range. Rather than operating the amplifiers so that they may operate in both ranges, the adjustment may reduce operation to only the allowed range, and power dissipation may be reduced in consequence. In some embodiments, users may also specify power profiles to reduce power during certain times of day or when the device is located in a particular location of a building or other environment.

At block 830, the device may monitor internal and/or external conditions to determine if reassessment is necessary. For example, the system may consult an internal timetable specified by a user and adjust the behavior based thereon. As another example, regulatory changes by local governments may be pushed from the server to the device, e.g., via the profile, and the device may reconsider the profiles to determine if a more appropriate configuration, e.g., such as the amplifier bias points, should be adopted.

Figure 9:
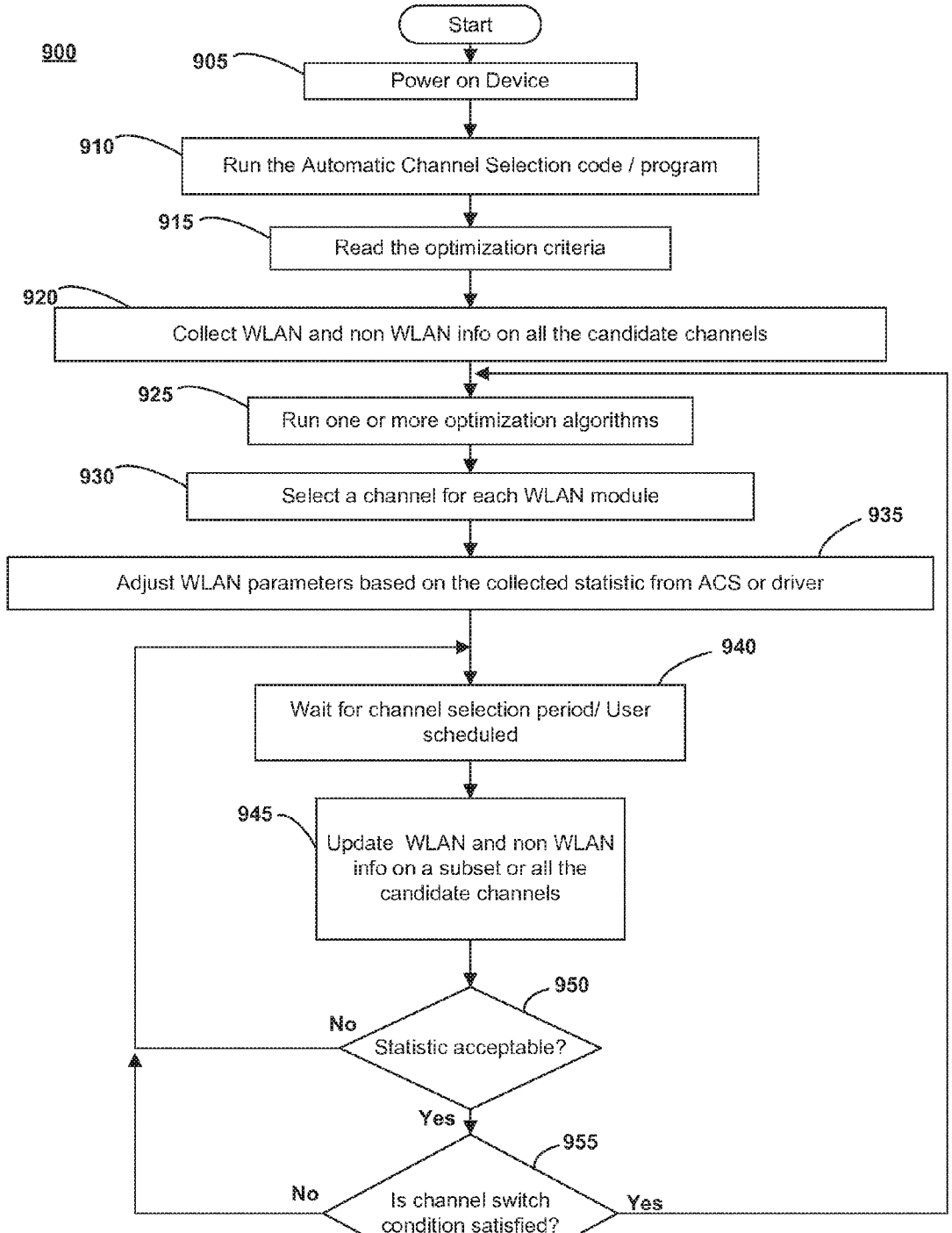
FIG. 9 is a flow diagram depicting various power consumption control operations as may be implemented in some embodiments.

FIG. 9 is a flow diagram depicting various power consumption control operations as may be implemented in some embodiments. At block 905, the system may be powered on, either manually by a user or automatically via, e.g., an internal or external timer. At block 910, the system may present an automatic channel selection code used for a wireless interface. The selection code may run upon a host processor or upon a wireless module of a wireless access point and may identify each channel the access point should operate on for each wireless interface. For example for dual band APs, there may be one or two instances of the selection code running to pick the channel for each band. The selection code may permit the user to specify a desired channel selection. In some embodiments, the selection may be specified automatically by a profile.

At block 915, the system may read optimization criteria, e.g., from a profile, or as specified by the manufacturer and/or user. At block 920, the system may collect the WLAN and non-WLAN information on all the candidate channels. This information may include, e.g., the number and type of stations to be associated with each channel, the interference on the channel, power levels, WLAN activity (a number of APs, how busy they are, etc.), a spectral mask of WLAN signals, TX power level on different channels, non-WLAN activity (baby monitor, microwave, etc.) etc. The power may vary due to regulatory and/or hardware limitations.

At block 925, the system may run one or more optimization algorithms, e.g., a weighted sum of each grade for each optimization criteria, weighted square summation of each optimization criteria, etc. The system may calculate a grade, or metric, for each channel, and then based upon the grades the preferred channel(s) may be selected. The grade may be calculated for overlapping and/or non-overlapping channels in some embodiments. For each WLAN OBSS a negative grade may be added based upon the magnitude of the overlapping part of the spectrum mask of the OBSS. A spectral mask measurement may include the effect of a nominal BSS on a neighboring BSS' adjacent channels in the frequency domain using a spectral mask as defined in the 802.11 specification. The WLAN activity, e.g., the number of APs on different channels, may be calculated using a deep scan. The percentage of activity on each channel may also be measured. If the overlapping part of the mask is smaller than a threshold, no negative grade may be added. A negative grade may be added in proportion to the amount of noise present on a channel. If the noise is above a certain threshold, the channel may not be used in some embodiments. A positive grade may be added based upon the maximum transmit power in each channel. Once a cumulative grade has been created for each channel, a total or partial ordering of the channels may be created.

As mentioned, the metric for each channel based upon the above parameters may be a weighted sum. The weight for each parameter may depend upon the hardware and software characteristics of the access point or of the STAs to be serviced. For example some wireless designs may be more prone to noise from non-WLAN interference while others may be more prone to a strong overlapping signal that may saturate the radio, etc.

The type of traffic serviced may also affect the weights used in the grading system. Delay sensitive traffic (VoIP, video, gaming) may suffer more from intermittent noise or interference while non-real-time traffic (file transfer, email, etc.) is less affected.

At block 930, the system may select a channel for each WLAN module, e.g., using the partial or total ordering determined above. At block 935, the system may adjust WLAN parameters based upon collected statistics from an Active Channel Selection (ACS) or driver. Parameters such as transmit power and receive sensitivity may be adjusted based on the amount of interference and type of service. The selected transmit power may be used to adjust power amplifier parameters to achieve the best power consumption or best transmit signal quality. The best power consumption and the best transmit signal quality may be based upon the requirement and the channel status. The adjustment may be performed via a software command changing one or more of wireless hardware settings, toggling an I/O line, adjusting a voltage or bias current, etc. At block 940, the system may wait for the channel selection period, either as automatically specified or as determined by the user. At block 945, the system may update the WLAN and/or non-WLAN information (interference such as baby monitors, microwave ovens, and other noise sources determined, e.g., using spectral analysis) on all or a subset of the candidate channels. At block 950, the system may determine if the statistics are acceptable. At block 955, the system may determine if a channel switch condition is satisfied, and if so, proceed to run a new round of optimizations at block 925. Otherwise, the system may return to block 940.

Figure 12:
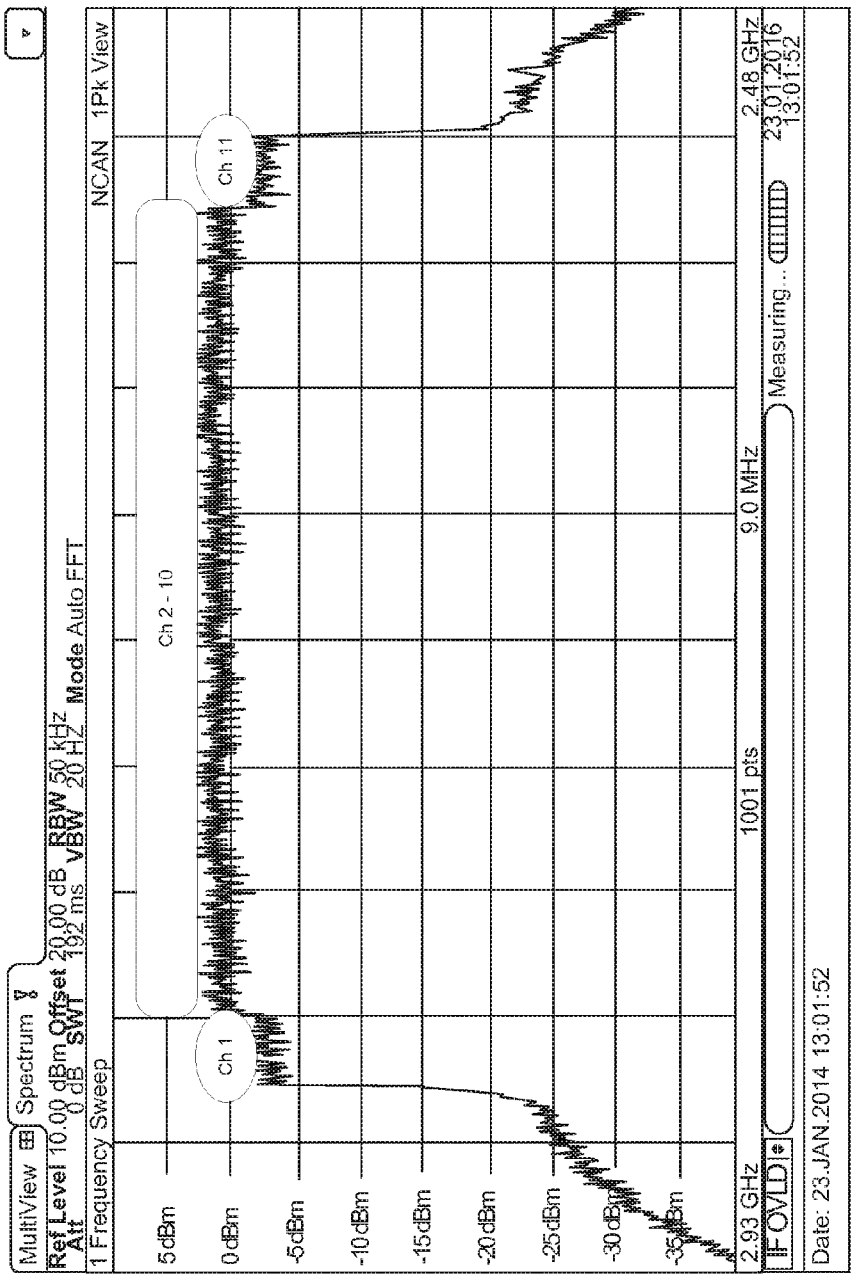
FIG. 12 is a plot of the DC power consumption for various channels in 802.11g mode as may be associated with some embodiments.
Figure 13:
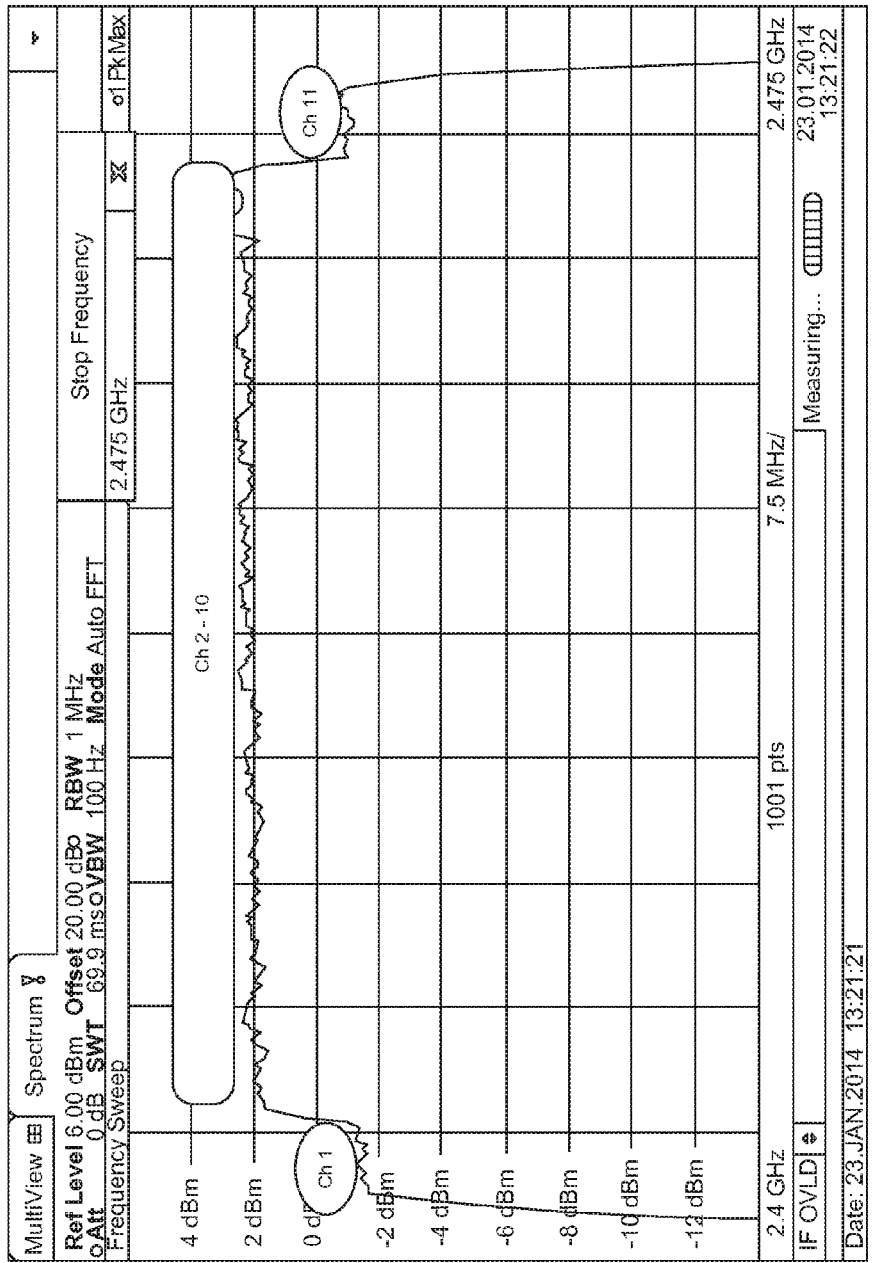
FIG. 13 is a plot of the DC power consumption for various channels in 802.11n mode as may be associated with some embodiments.
Figure 14:
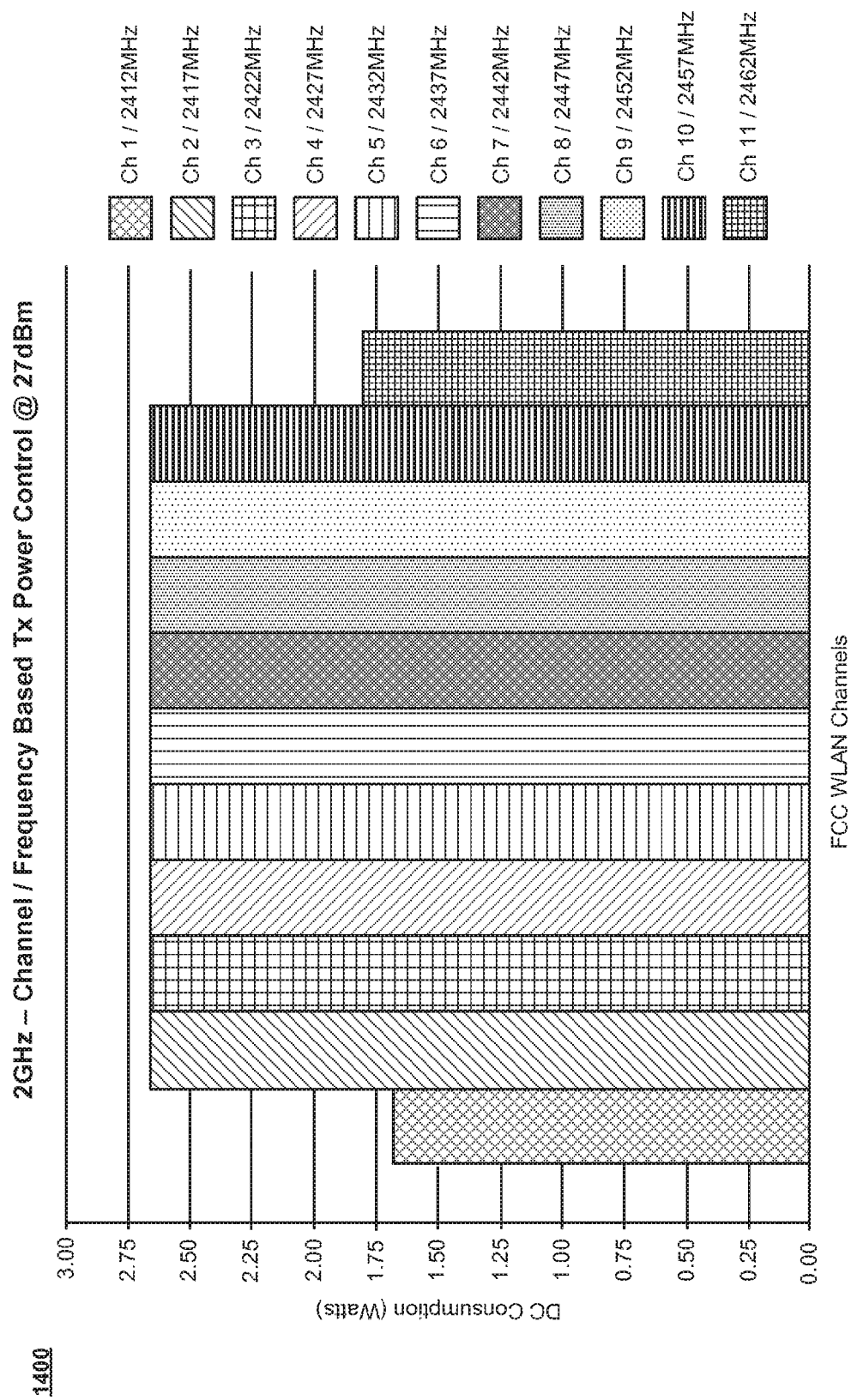
FIG. 14 is a bar plot depicting various power consumption levels for various channels as may be associated with some embodiments.
Figure 15:
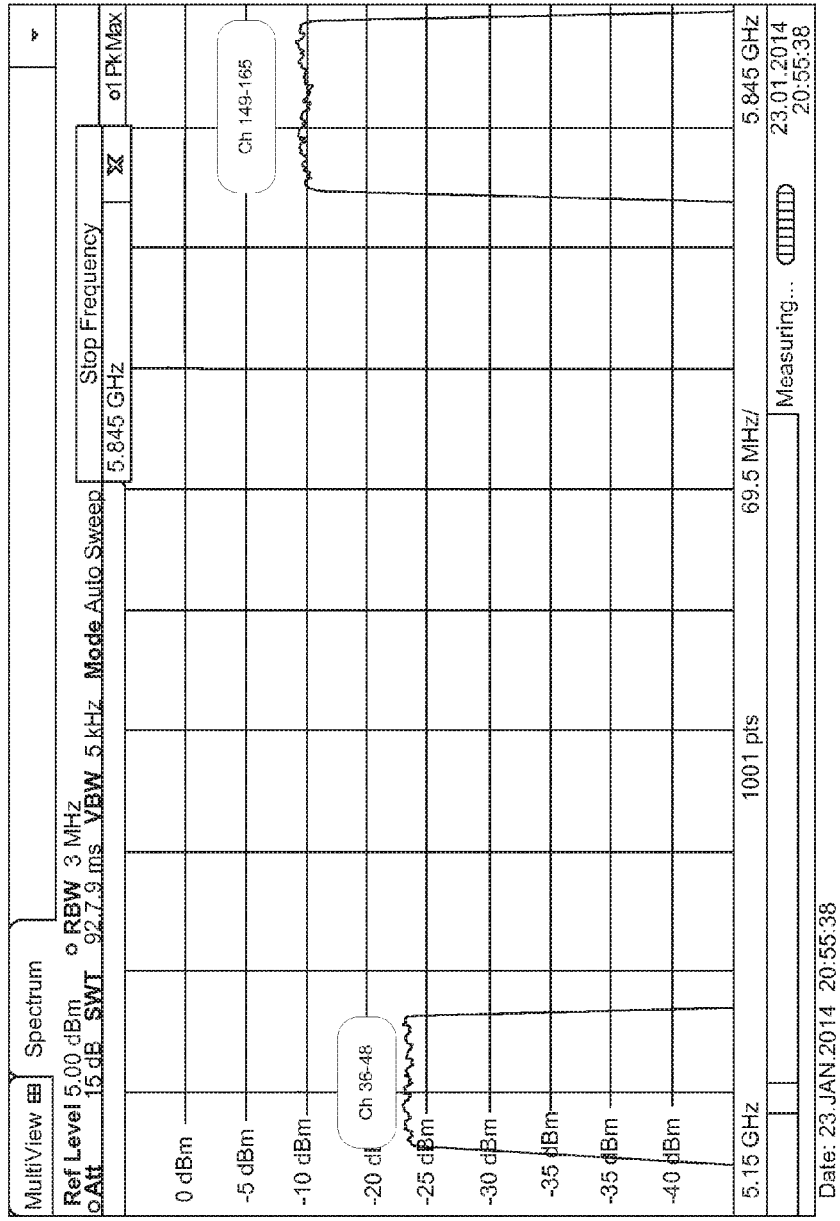
FIG. 15 is a plot of the DC power consumption for various channels as may be associated with some embodiments.

FIG. 10 is a table 1000 depicting various current and power levels for various channels as may be associated with some embodiments. FIG. 11 is a table 1100 depicting various current and power levels for various channels as may be associated with some embodiments. FIG. 12 is a plot 1200 of the DC power consumption for various channels in 802.11g mode as may be associated with some embodiments. FIG. 13 is a plot 1300 of the DC power consumption for various channels in 802.11n mode as may be associated with some embodiments. FIG. 14 is a bar plot 1400 depicting various power consumption levels for various channels as may be associated with some embodiments. FIG. 15 is a plot 1500 of the DC power consumption for various channels as may be associated with some embodiments.

Computer System

Figure 16:
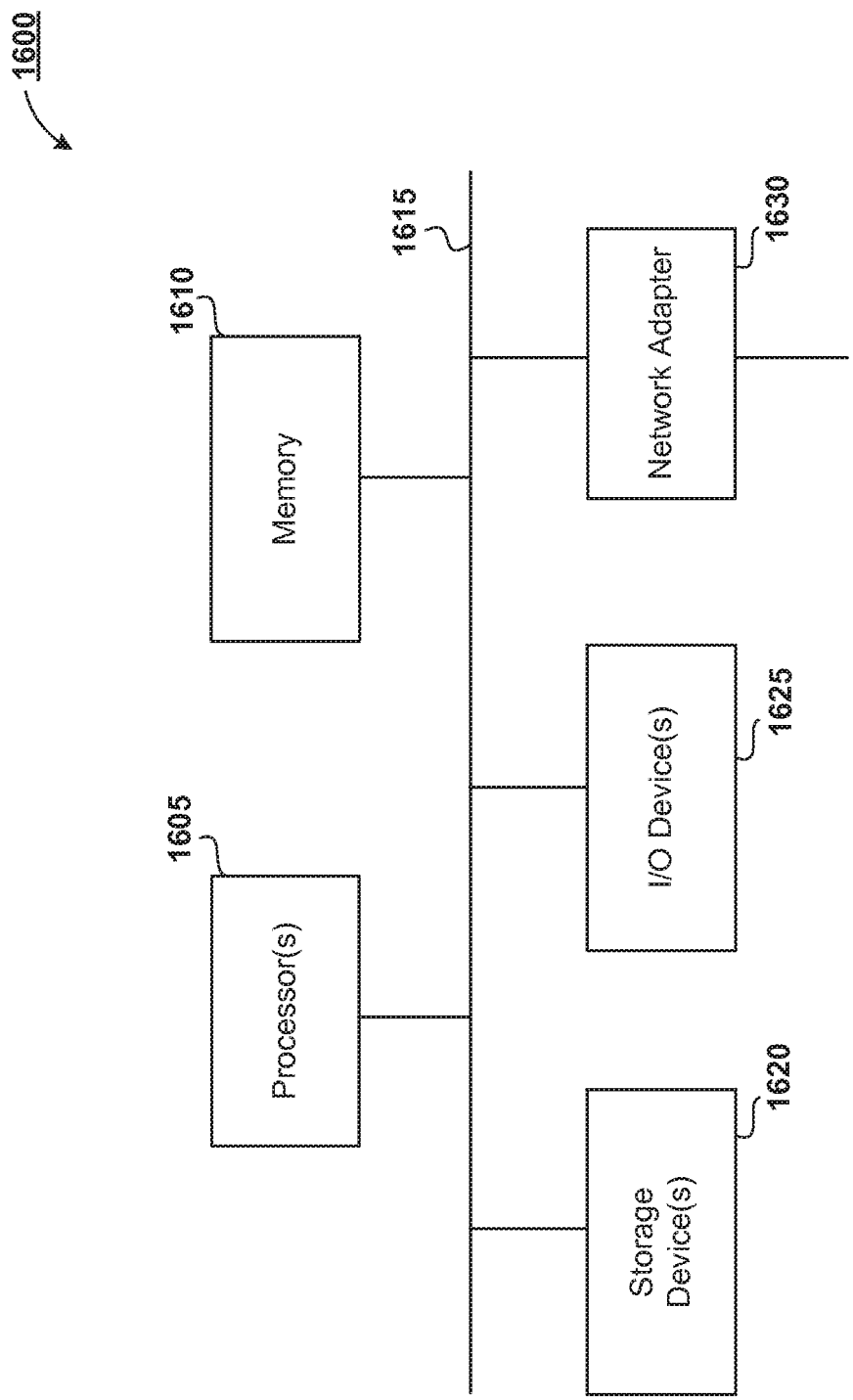
FIG. 16 shows a diagrammatic representation of a machine in the example form of a computer system within which a set of instructions for causing the machine to perform one or more of the methodologies discussed herein may be executed.

FIG. 16 is a block diagram of a computer system as may be used to implement certain features of some of the embodiments. Though generally presented herein as an access point or router, the computer system may be a server computer, a client computer, a personal computer (PC), a user device, a tablet PC, a laptop computer, a personal digital assistant (PDA), a wireless access point, a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 1600 may include one or more central processing units ("processors") 1605, memory 1610, input/output devices 1625 (e.g., keyboard and pointing devices, touch devices, display devices), storage devices 1620 (e.g., disk drives), and network adapters 1630 (e.g., network interfaces) that are connected to an interconnect 1615. The interconnect 1615 is illustrated as an abstraction that represents any one or more separate physical buses, point to point connections, or both connected by appropriate bridges, adapters, or controllers. The interconnect 1615, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1610 and storage devices 1620 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non-transitory" media) and computer-readable transmission media.

The instructions stored in memory 1610 can be implemented as software and/or firmware to program the processor(s) 1605 to carry out actions described above. In some embodiments, such software or firmware may be initially provided to the processing system 1600 by downloading it from a remote system through the computing system 1600 (e.g., via network adapter 1630).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A computer-implemented method on a wireless device for adjusting the wireless device's power configuration, the method comprising:

selecting a profile, the profile comprising a first criterion;

determining that a current power configuration of the wireless device fails to meet the first criterion based upon a plurality of stimuli;

determining that applying a power configuration adjustment at a particular time is acceptable;

determining an optimized power configuration for the wireless device, the optimized power configuration indicating a power level suitable for a plurality of stations in communication with the wireless device, the optimized power configuration determined based upon the selected profile; and adjusting the power configuration based upon the optimized power configuration at the particular time.

2. The computer-implemented method of claim 1, wherein the profile indicates a regulatory transmission constraint associated with a regional location.

3. The computer-implemented method of claim 2, further comprising: determining a regional location of the wireless device by determining an Internet Protocol address associated with the wireless device or an Internet Protocol address associated with a device in communication with the wireless device.

4. The computer-implemented method of claim 3, wherein selecting a profile comprises sending the regional location to a server and receiving the profile from the server.

5. The computer-implemented method of claim 1, wherein the criterion comprises a restriction on a range of at least one of the stimuli.

6. The computer-implemented method of claim 1, wherein the stimuli comprises one or more of ranges associated with a plurality of stations, regulatory based power control information, user defined power control data, data transferred to a plurality of stations, the RSSI of a plurality of stations, and a temperature of at least a portion of the wireless device.

7. The computer-implemented method of claim 1, wherein the profile comprises a plurality of rules, the rules indicating correspondences between power configurations and ranges associated with a plurality of criterion.

8. The computer-implemented method of claim 7, the method further comprising retrieving the profile from across a network.

9. The computer-implemented method of claim 1, wherein the optimized power configuration comprises an amplifier bias point different from an amplifier bias point associated with the current power configuration.

10. The computer-implemented method of claim 1, wherein the profile specifies different power levels for different channels.

11. A non-transitory computer-readable medium comprising instructions configured to cause one or more computer systems to perform a method comprising:
selecting a profile, the profile comprising a first criterion;
determining that a current power configuration of the wireless device fails to meet the first criterion based upon a plurality of stimuli;
determining that applying a power configuration adjustment at a particular time is acceptable;
determining an optimized power configuration for the wireless device, the optimized power configuration indicating a power level suitable for a plurality of stations in communication with the wireless device, the optimized power configuration determined based upon the selected profile; and
adjusting the power configuration based upon the optimized power configuration at the particular time.

12. The non-transitory computer-readable medium of claim 11, further comprising:
determining a regional location of the wireless device by determining an Internet Protocol address associated with the wireless device or an Internet Protocol address associated with a device in communication with the wireless device.

13. The non-transitory computer-readable medium of claim 11, the method further comprising retrieving the profile from across a network.

14. The non-transitory computer-readable medium of claim 11, wherein the profile comprises a plurality of rules, the rules indicating correspondences between power configurations and ranges associated with a plurality of criterion.

15. The non-transitory computer-readable medium of claim 11, wherein the optimized power configuration comprises an amplifier bias point different from an amplifier bias point associated with the current power configuration.

16. A computer system comprising:
at least one processor;
at least one memory comprising instructions configured to cause the at least one processor to perform a method comprising:
selecting a profile, the profile comprising a first criterion;
determining that a current power configuration of the wireless device fails to meet the first criterion based upon a plurality of stimuli;
determining that applying a power configuration adjustment at a particular time is acceptable;
determining an optimized power configuration for the wireless device, the optimized power configuration indicating a power level suitable for a plurality of stations in communication with the wireless device, the optimized power configuration determined based upon the selected profile; and
adjusting the power configuration based upon the optimized power configuration at the particular time.

17. The computer system of claim 16, further comprising:
determining a regional location of the wireless device by determining an Internet Protocol address associated with the wireless device or an Internet Protocol address associated with a device in communication with the wireless device.

18. The computer system of claim 16, the method further comprising retrieving the profile from across a network.

19. The computer system of claim 16, wherein the profile comprises a plurality of rules, the rules indicating correspondences between power configurations and ranges associated with a plurality of criterion.

20. The computer system of claim 16, wherein the optimized power configuration comprises an amplifier bias point different from an amplifier bias point associated with the current power configuration.

* * * * *